United States Patent [19]

Deux et al.

[11] 4,435,950
[45] Mar. 13, 1984

[54] FRUIT OR BERRY HARVESTING DEVICE FOR IN-LINE CROPS

[75] Inventors: Alain Deux, Angers; Jean C. Merant, Doue La Fontaine, both of France

[73] Assignee: Braud, Societe Anonyme Francaise, Angers, France

[21] Appl. No.: 408,889

[22] Filed: Aug. 17, 1982

[30] Foreign Application Priority Data

Aug. 31, 1981 [FR] France ................................ 81 16564

[51] Int. Cl.$^3$ ............................................ A01D 46/00
[52] U.S. Cl. .................................... 56/330; 56/328 R
[58] Field of Search ...................... 56/119, 328 R, 330

[56] References Cited

U.S. PATENT DOCUMENTS 4,282,706 8/1981 Orlando ................................ 56/330
4,292,792 10/1981 Burton ................................ 56/330

FOREIGN PATENT DOCUMENTS 2277526 2/1976 France .................................. 56/330
425587 11/1974 U.S.S.R. ................................ 56/330

Primary Examiner—Paul J. Hirsch
Assistant Examiner—David I. Tarnoff

[57] ABSTRACT

A device for harvesting fruits or berries, particularly grapes, for in-line crops is of the type formed by a vehicle on which are rotatably mounted "hedgehog" drums with fingers or whips penetrating into the vegetation and dislodging the fruits. The drums are subdivided into superimposed coaxial elements each comprising a hub fixed on a vertical drive shaft and forming a variable angle with this latter and sleeves mounted freely rotatable on these hubs and also sloping by the same angle, these hubs carrying fingers and a support for rotatably driven vibrating inertia blocks. This device causes vibration of said fingers, which is adjustable by adjusting the rotational speed of the shaft, by varying the angle and the clearance of the inertia blocks, which vibration is the resultant of the vertical component and a horizontal component adjustable independently of each other.

4 Claims, 3 Drawing Figures

FRUIT OR BERRY HARVESTING DEVICE FOR IN-LINE CROPS

BACKGROUND OF THE INVENTION

The present invention relates to a fruit or berry, and more particularly wine grape, harvesting device for in-line crops, by causing them to be dislodged by means of vibrations imparted to the plant so that they are efficiently dislodged without causing appreciable damage to the plant or the fruit.

To this end, this device combines horizontal acceleration and vertical acceleration to which is added the acceleration of gravity.

The main devices for harvesting fruit by dislodging them known up to the present are the following:

Horizontal Transverse Acceleration (a) the system for transversely shaking the vegetation by means of whips produces good dislodging efficiency but its harsh action on the whole of the vegetation which it encompasses and propels causes the fruit to burst because of the close contact between the propelling means and the fruit. Furthermore, this system also causes damage to the plants (stripping of leaves, breakage of branches), especially when these plants are not well adapted to the system;

(b) the system of transverse shaking of the trunks by means of "skis" overcomes the two preceding problems since, propelled by the trunk, the vegetation and the fruits are not in contact with the propelling members. But this device requires very high trunks so as not to damge them or cause irreparable damage to the root system. Thus, its application is very limited.

Longitudinal Horizontal Acceleration

This system is formed by "hedgehog" drums formed of horizontal radial needles freely rotating dependent on the speed of advance of the machine, about a vertical axis; the needles penetrate into the leaves and are driven with a vibratory motion in the horizontal plane, about their rotational axis, which vibratory motion is caused for example by rotating an excentric mass integral with the needles. This system, because of the intimate penetration of the needles into the vegetation and because of the absence of shock between needle and vegetation or fruits causes less damage to the crop (less burst fruit) and to the vegetation (lesser amount of leaf stripping and breakage of branches).

On the other hand, with espalier trained crops such as vines (longitudinal wires to which the branches supporting the crop are attached), this system is inefficient because the longitudinal acceleration is stopped by the infinite longitudinal rigidity of the espalier on which the vegetation is fixed.

In addition, this system is not suitable for a large number of crops.

Vertical Acceleration (a) acceleration of the espalier wire: fingers impart to the espalier wires a vertical acceleration which, transmitted to the vegetation which it supports, causes the crop to be dislodged.

This system is only adapted to certain very specific types of crop, where the vegetation is intimately bound up with the espalier wires, for if branches are not thus intimately bound up, they are not affected by the vibrations;

(b) acceleration of the vegetation: fingers "comb" the whole of the vegetation during a vertical upward movement. To be efficient, this action must be insistent and causes excessive stripping of the leaves of the vegetation.

The aim of the present invention is to provide a fruit or berry harvesting device through dislodging same with acceleration of the vegetation, having in relation to known systems the whole of the following qualities:

good efficiency in dislodging the fruits;

respect for the crop: in fact, a burst crop results in high juice loss. In addition, it is vulnerable to external agents and conservation thereof is adversely affected;

respect of the vegetation, for considerable damage during harvesting has harmful influence on the following plant cycle;

good general application and adaptation to the main systems for managing in-line crops, and principally vines.

SUMMARY OF THE INVENTION

The system of the invention is based on the known system of "hedgehog" drums imparting to the vegetation a longitudinal horizontal acceleration. This system damages the drop and the vegetation less because it explores it as a whole without harshness or shocks, with vibrations of low amplitude. But in the system of the invention, the longitudinal horizontal acceleration, which is inefficient with an espalier, is replaced by vertical acceleration, which may shake the wires and the vegetation. The efficiency of vertical acceleration is further increased because, to the downward vertical acceleration, is added the acceleration of gravity and because the force of inertia is added to the weight of the fruit.

Furthermore, since purely vertical acceleration is not efficient enough in the case of vertical branches, the device of the invention combines vertical acceleration with horizontal acceleration so as to create an acceleration component sloping in the plane of the row of vegetation, this slope being adjustable by varying each of the components and thus to make the device efficient in a large number of types of management.

To attain these results the invention provides a device for harvesting fruits and berries by dislodgement for in-line crops, acting by vibration of the vegetation, comprising one or more pairs of "hedgehog" drums with vertical axis, each pair encompassing the vegetation, each drum receiving a number of flexible fingers penetrating into the vegetation under the action of an application force, each drum being free to rotate and rotating in dependence on the advance of the machine so that the fingers exploring the vegetation are fixed with respect thereto, each drum being equipped with one or more eccentric inertia blocks rotating about a shaft integral with the drum, this rotation occurring in a substantially horizontal plane so as to impart to the fingers a horizontal vibration, wherein the fingers are fixed to the periphery of a sleeve sloping at an angle $\alpha$ with respect to the shaft of the drum, the sleeve is free to rotate about a hub fixed on the shaft and whose axis is sloping by the same angle $\alpha$ with respect to said shaft, so that rotation of the shaft causes sinusoidal vibration of the fingers in a vertical plane passing through the shaft, this vibration being adjustable from zero to its maximum by varying the rotational speed of the shaft or by varying the angle of slope, which vertical vibration is combined with the previously described horizontal vibration, itself adjustable from zero to its maximum, so as to obtain a resultant vibration which may assume any slope and any value between the vertical and the horizontal.

BRIEF DESCRIPTION OF THE DRAWINGS

One embodiment of this device will be described hereafter in greater detail.

DESCRIPTION OF THE PREFERRED EMBODIMENT

Figure 1:
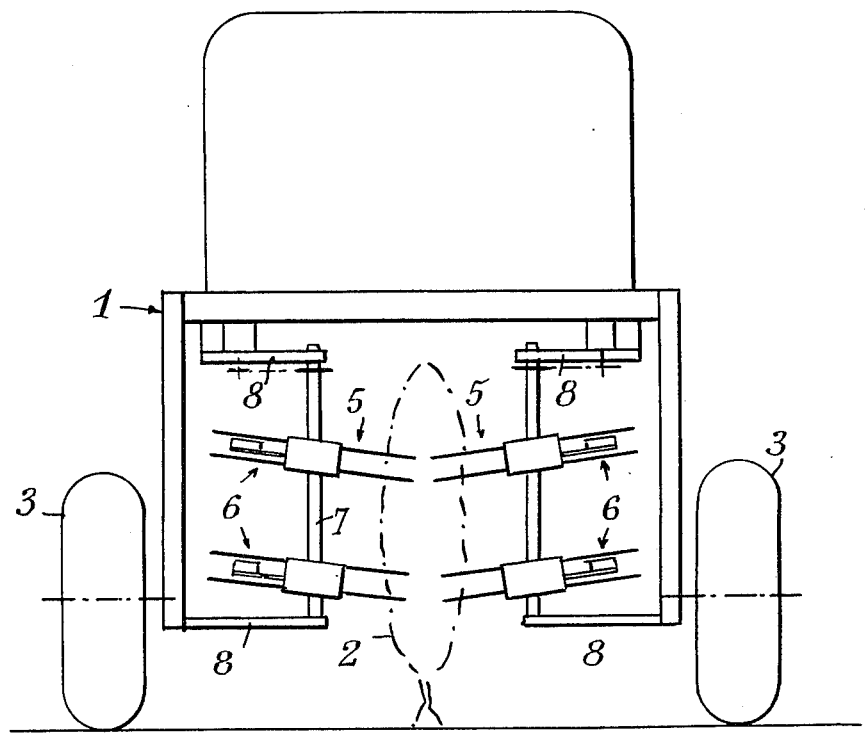
FIG. 1 is a simplified schematical view of a harvesting machine of the type of the invention.
Figure 2:
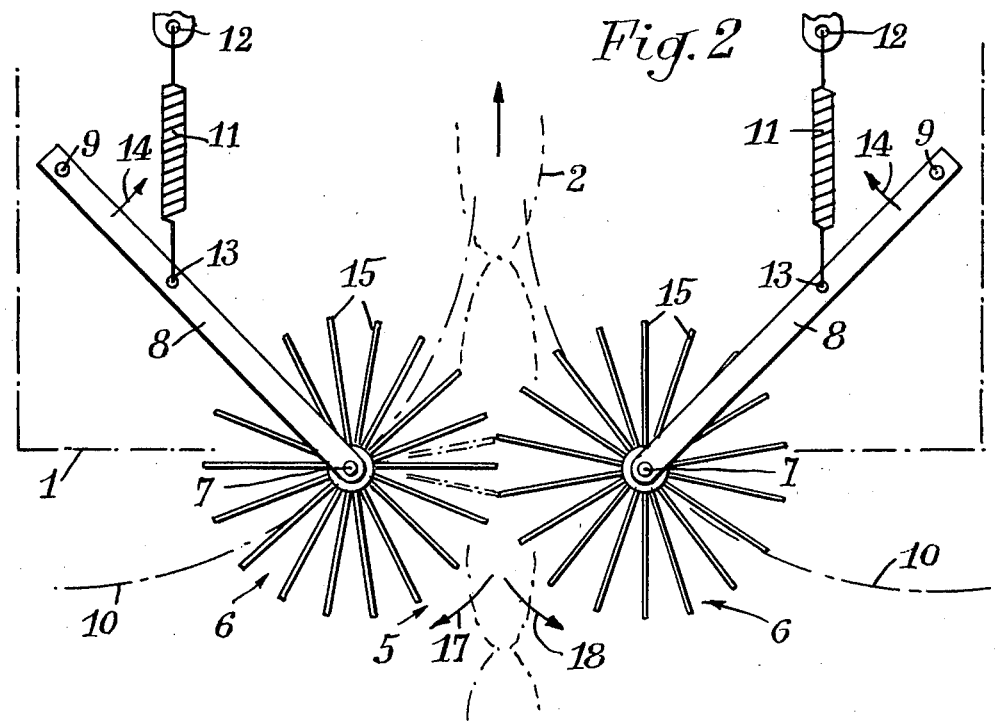
FIG. 2 is a schematical view of the dislodgement device seen from above.

The harvesting machine for in-line crops comprises, in a way known per se, a frame 1, astride a row of plants 2, moving with respect to the ground by means of wheels 3. It further comprises a fruit dislodging system 5, a sealing, reception and discharge system for the dislodged crop (not shown).

System 5 for dislodging the crop comprises, in a way known per se, one or more pairs of "hedgehog" drums 6 with vertical axis 7. Each drum is supported by two horizontal arms 8 (a lower one and an upper one). These arms pivot about a vertical fixed shaft 9 in the machine, this shaft 9 being offset outwardly and forwardly of shaft 7 of drum 6. Thus, shaft 7 of drum 6 may move over an arc of a circle 10 centered at 9. However, a spring 11 attached at a fixed point 12 and to a point 13 of an arm 8 creates a force 14 returning the support arms 8, thus forcing the drum 6 to penetrate into the vegetation.

Each drum 6 is equipped with fingers or whips 15 made from a flexible material, disposed fanwise in the same horizontal row, the drum comprising several rows depending on the area to be explored. These fingers are fixed to a sleeve 16 capable of loosely rotating on a hub 26 through a ball bearing 40. This hub 26 is integral with a tranverse shaft 36 keyed to the driving shaft 7 and is sloping through an angle $\alpha$ with respect to the vertical axis by means of a sleeve 31 fixed on to shaft 7 and having two adjusting screws 37 bearing on the upper face of hub 26. Since this shaft 7 is free to rotate, penetration of fingers 15 into the vegetation, associated with the forward motion of the machine, causes drums 6 to rotate in directions 17 and 18 (opposite on each side of the row), at a speed proportional to the speed of advance of the machine. Thus, the tips of fingers 15 in contact with the vegetation are motionless with respect to this latter.

In the device of the invention, fingers 15 are mounted perpendicular on sleeves 16, 16a . . . etc., independently and in superimposed relation, each sleeve comprising one or more rows of fingers (two in the drawings).

The axis of each sleeve is inclined with respect to the vertical by an angle $\alpha$ variable from one to the other; fingers 15 are inclined by the same angle with respect to the horizontal. Shaft 7 is supported by two horizontal arms 8 on which it may rotate. As in the known device, arms 8 pivot about a fixed vertical shaft 9 in the machine and are subjected to a force 14 which tends to cause fingers 15 to penetrate into the vegetation.

Figure 3:
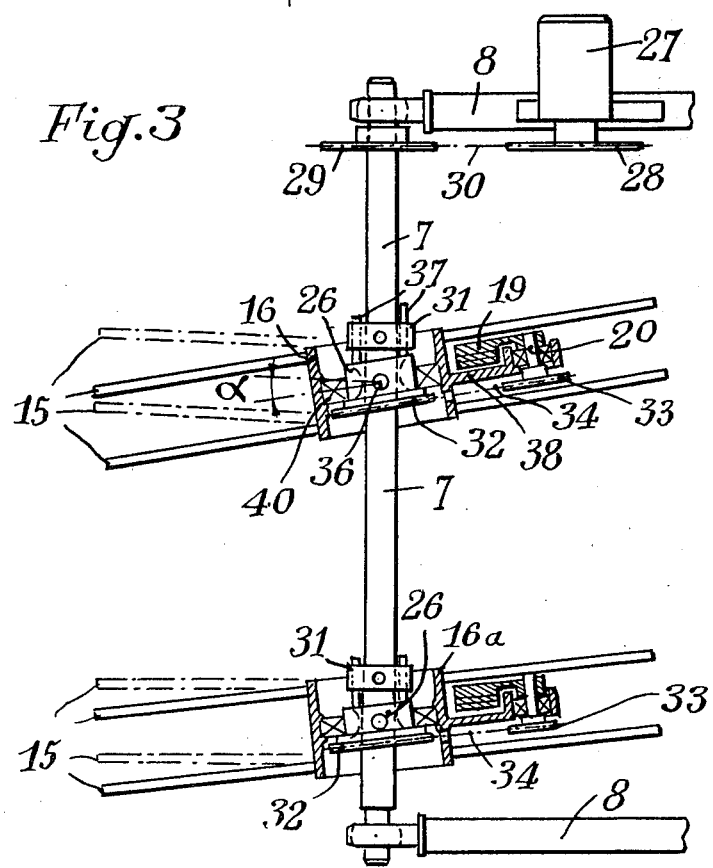
FIG. 3 shows the vertical section of a drum of the device of the invention.

But, according to the device of the invention, shaft 7 is rotated by a motor 27, through two pinions 28 and 29 and a chain 30. Rotation of shaft 7 is imparted to hubs 26 fixed on the shaft. After a half revolution of shaft 7, the angle of inclination $\alpha$ of hubs 26 will be opposite the initial angle $\alpha$. Thus, since fingers 15 are sloping downwards at the outset by an angle $\alpha$ (FIG. 3, continuous line), they slope upwardly by an angle $\alpha$ after a half revolution of shaft 7 (FIG. 3, dash-dot line) and resume their starting position after one whole revolution. The tips of fingers 15 are then driven with a sinusoidal movement in a vertical plane passing through shaft 7. This movement imparts to the vegetation a vertical acceleration. This acceleration is adjustable by varying one or both of the following factors: the rotational speed of shaft 7 and the value of angle $\alpha$. The variation of angle $\alpha$ of the hubs may be obtained by any appropriate means and it may be the same between all the hubs 26 or different for each hub, with unit adjustment.

It is thus possible to impart a modulable acceleration depending on the height of the vegetation.

According to another feature of the invention, an inertia block 19 is driven with a rotary movement about a shaft 20 carried by an arm 38 of support 16. The movement is imparted by rotation of shaft 7 through pinions 32 and 33 and chain 34. Thus, independently of the vertical acceleration, this eccentric rotating inertia block will impart to the fingers a vibration depending on its mass, its eccentricity and its rotational speed, in a substantially horizontal plane. The vegetation will thus be subjected to horizontal acceleration. This may be adjustable, independently of the vertical acceleration, by varying one or more of the following parameters: the inertia block, its eccentricity, its speed (through pinions 32 and 33).

Thus, with the device of the invention, vegetation may be subjected to acceleration through flexible vibratory fingers which penetrate therein while being motionless with respect thereto (except for the vibration). This acceleration is the resultant of two components:

vertical acceleration due to rotation of shaft 7 and to the slope $\alpha$ of hub 26;

horizontal acceleration due to the rotation of an eccentric inertia block 19 about a shaft 20 carried by an arm 38 of support 16.

Each of the components is adjustable from zero to a maximum. Thus, the resultant may assume all the values and all the slopes between vertical and horizontal.

Furthermore, a different adjustment may be adopted for each stage of fingers supported by the same support 16, not only for the vertical component but also for the horizontal component and thus impart a different acceleration depending on the height of the vegetation.

What is claimed is:

1. A machine for harvesting fruits and berries by dislodgment for in-line crops, by vibration of the vegetation, comprising pairs of "hedgehog" drums with vertical axes, arms supporting said axes free to pivot with resilient return about fixed axes of the machine, angularly adjustable hubs fixed on said axes of the drums inclined by at an angle with respect to said axes of the drums, sleeves mounted freely rotatable about said hubs and inclined by the same angle, flexible fingers fixed radially to said sleeves, eccentric fly-weights free to rotate about axes carried by arms extending radially from the sleeves, means for controlling the speed of rotation of the axes of the drums and of a chain and gear wheel transmission coupling the axes of the drums to the axes of the fly-weights, the rotation of the axes of the drums causing a sinusoidal vibration of the fingers in a vertical plane passing through said axes of the drums, which vibration is adjustable from zero to its maximum by variation of the speed of rotation of said axes and by variation of the angle of inclination of the hubs, which vertical vibration is compounded by the adjustable horizontal vibration due to the fly-weights, the horizontal vibration being adjustable by varying at least one of the weight, eccentricity and speed of the fly-weights.

2. The device as claimed in claim 1, comprising a ring for adjusting inclination of each hub, said ring being fixed on each drum axis and having two adjusting screws bearing on the upper face of the hubs.

3. The device as claimed in claim 1, wherein the sleeves of the drums are independent and each have an individual adjustment of their angle so as to obtain a vertical vibration of the same frequency but of a different amplitude between each sleeve, thereby making possible a different vertical acceleration depending on the height of the vegetation.

4. The device as claimed in claim 1, wherein the horizontal vibration is also adjustable independently for each sleeve, by variation of the mass of the fly-weights, their eccentricity and their speed, thereby making possible a different horizontal acceleration depending on the height of the vegetation.

* * * * *